United States Patent [19]
Warkentin

[11] Patent Number: 5,741,344
[45] Date of Patent: Apr. 21, 1998

[54] CONVERSION OF AGRICULTURAL WASTE USING WORMS

[76] Inventor: Robert K. Warkentin, 2834 S. Kent, Visalia, Calif. 93277

[21] Appl. No.: 568,679
[22] Filed: Dec. 7, 1995
[51] Int. Cl.⁶ .................................................. C05F 9/04
[52] U.S. Cl. ........................ 71/9; 71/15; 71/21; 71/23
[58] Field of Search ........................ 71/9, 10, 11, 15, 71/21, 23, 64.13

[56] References Cited

U.S. PATENT DOCUMENTS 4,108,625  8/1978  Okada ................................. 71/9
5,082,486  1/1992  Glogowski ........................... 71/9

Primary Examiner—Ferris Lander
Attorney, Agent, or Firm—Lyon & Lyon LLP

[57] ABSTRACT

A process for the conversion of organic agricultural waste into a soil amendment uses earthworms. The organic material is rent into small pieces, placed in a rick with 60% or more moisture. Earthworms are added to the rick for the consumption of the decomposing organic material. Succeeding ricks are added as the material is being consumed until the resulting castings can be most efficiently separated from the earthworms and remaining organic material. Storage as silage of the organic agricultural material may be employed between harvesting and addition of the earthworms.

10 Claims, 1 Drawing Sheet

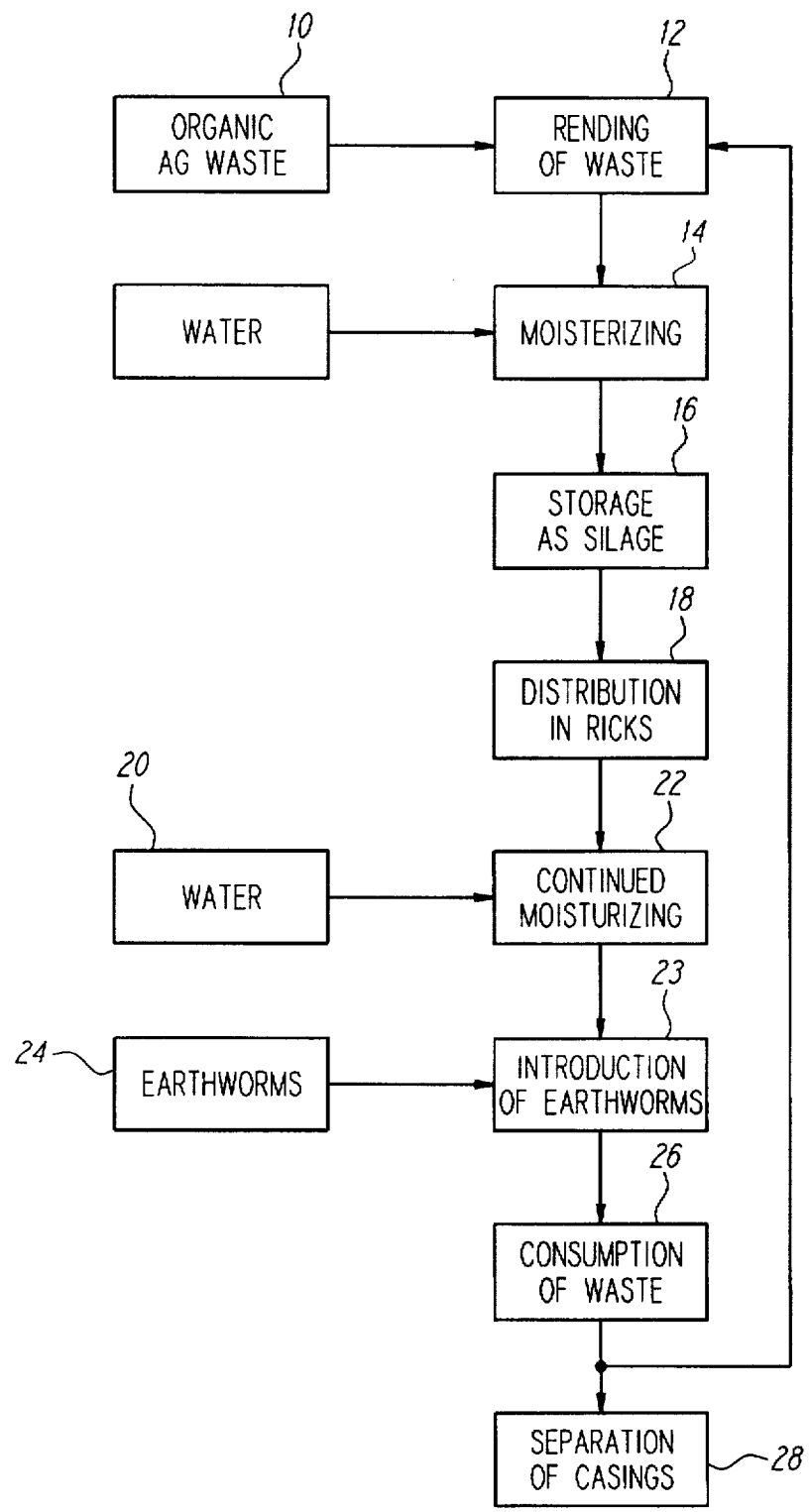

CONVERSION OF AGRICULTURAL WASTE USING WORMS

BACKGROUND OF THE INVENTION

The field of the present invention is processes for the conversion of organic materials by earthworms.

Earthworms comprise a group of invertebrates which live in the ground, eat decomposing organic material and produce a rich earthy substance referred to as castings. More technically, the worms are terrestrial annelid worms which are any of a family of numerous widely distributed hermaphroditic worms that move through the soil by means of setae. Of these several varieties, the red worm has been found to be a hearty, rapidly multiplying organism capable of eating significant amounts of decomposing organic material.

Worms have long been used for bait and for the conversion of some materials into soil like material. Consequently, they have been raised purposely toward these ends. The rate of reproduction of such animals is spectacular, increasing by as much as 1,200 times in a year.

A need has been established for the conversion of organic agricultural waste to a neutral or useful product. The conventional method of burning such waste material as rice straw, almond shells and the like is coming into disfavor and legislative prohibition. An environmentally neutral or advantageous process is needed.

SUMMARY OF THE INVENTION

The present invention is directed to a process for the conversion of organic agricultural waste using earthworms to create an environmentally beneficial product. Earthworms are introduced into ricks of organic agricultural waste. The waste is wet and retained as wet during the conversion process. The end results are castings which are useful as a soil amendment high in trace minerals. The worms can be reused either through the addition of further organic waste to the rick or through separation of the castings from the substantially consumed waste and the earthworms and introduction of the worms to a new rick. The agricultural waste may first be stored as silage where anaerobic decomposition can commence and the material can be efficiently stored for later processing.

Accordingly, it is a principal object of the present invention to provide an improved method for the processing of organic agricultural wastes into an environmentally useful product. Other and further objects and advantages will appear hereinafter.

BRIEF DESCRIPTION OF THE DRAWING

The figure is a flow diagram of the process for conversion of agricultural waste using earthworms.

DETAILED DESCRIPTION OF THE PREFERRED EMBODIMENTS

The burning of rice straw in the central valley of California has been a conventional practice for the disposal of such material following harvest of the rice crop. Legislation is now in place which phases out this practice over a period of years. Other processes, not requiring open burning must, therefore, be instituted. To this end, earthworms can be employed to convert the decomposing straw into a beneficial soil amendment. This method can also be used with other organic waste including almond shells and the like having a significant disposal problem.

Red worms, a common earthworm, can be used for decomposing agricultural waste. Other earthworms are also good candidates for this process. The worms are most active during cool months and can consume up to their body weight in a day. Earthworms multiply rapidly, with one worm multiplying into as many as 1,200 worms in a year under good conditions.

The worms consume decomposing material and convert that material into castings. Castings contain nitrogen, phosphate, potash and trace minerals like copper, zinc and iron.

Turning to the figure, the process employed is shown schematically. A source 10 of organic agricultural waste may provide material in bailed or loose form. In the preferred embodiment, rice straw is contemplated. However, other straws, almond waste, green waste, cotton lint waste, cotton gin trash, manure and other agricultural waste material may also be used. The material may be rent 12 in the field by chopping using commercial choppers or other process coincident with the gathering of the material. Alternatively, the material may be later processed into small pieces, using tub grinders or choppers, even at the time of distribution into ricks. With some products the harvesting or processing operations actually rend the waste material adequately. This is true of almond waste. The size of the pieces into which the organic waste is rent depends on a number of factors. To ensure maximum compactness, smaller pieces are advantageous. Of course larger pieces require less processing. It is believed that with rice straw, chopping the straw into lengths which average two to three inches and under is sufficient.

Following the step 12 of rending, the rice straw or other organic agricultural waste is moisturized 14 to a level of at least about 60% by weight. The wet organic waste may be placed 16 in storage or directly distributed 18 in ricks. Placing the rent material in storage is advantageous if the acreage is not available for immediately forming ricks. Additionally, the storage may act to initiate a silage process, starting the decomposition needed by the earthworms for conversion of the material to castings. The wetting of the straw or other material acts to both compact the material, requiring less storage, and initiate the decomposition process.

Whether taken directly or from storage, the chopped organic agricultural waste is to be distributed 18 into ricks. The distribution may be accomplished by common farm equipment including conveyors, spreaders or feed wagons. The ricks are conveniently three feet wide so as to accommodate farm equipment and, of the extended length limited only by the space available.

Moisture 20 continues to be added to the ricks by wetting 22 the ricks using sprinklers or the like. The moisture content can be easily maintained at about at least 60% by weight. Sprinklers may be conveniently used for keeping the rick moisturized. Irrigation lines with spray emitters are most conveniently arranged adjacent the ricks for wetting the material. A short watering each morning should normally provide maintenance of an appropriate moisture level. Watering more or less often would depend on the weather. The addition of moisture results in a vertical compaction of the ricks. The compacted moisturized ricks should be about two to four inches in height. The wetted straw takes about one third of the space of a comparable amount of dry straw. The field used for the ricks should be well drained. About one acre will handle 1,000 tons dry weight of straw placed in such ricks.

The rice straw is now prepared for the introduction 23 of earthworms 24. The rate at which a rick is consumed by the earthworms depends on the number of worms introduced, their ability to multiply and the temperature. Worms are highly productive in cool to moderate temperatures with the best times in the central valley being from October to May with May being the peak month. It is estimated that a rick could be consumed if fully seeded with worms in four to six months. With the appropriate retained level of moisture and sufficient worms, the rick commences to be converted 26 from decomposing rice straw into castings.

Following the consumption of substantially all of a rick by the worms, the castings can be harvested 28. Screening equipment is available commercially for the separation of the castings from the worms and larger pieces of unconverted material. As the investment in worms would be lost by attempting to completely convert the rick such that no food is left for the worms, some material will remain unconverted. Consequently, a more efficient process is to simply repeat the steps of adding more rent organic material to the rick. Another rick of substantially the same size is simply defined on top of the first rick. Thus, the worms are able to continue operation without interruption or separation from the castings already developed. This process may be repeated until such time as the pile of material which is now mostly castings has reached approximately two feet thick. Then the separation 28 may take place with a much lower percentage of unconverted material left in the rick.

Thus, a method for consuming organic agricultural waste is disclosed which is environmentally advantageous. While embodiments and applications of this invention have been shown and described, it would be apparent to those skilled in the art that many more modifications are possible without departing from the inventive concepts herein. The invention, therefore, is not to be restricted except in the spirit in the appended claims.

What is claimed is:

1. A method for processing organic agricultural waste, comprising rending the waste into small pieces for handling and compaction;

wetting the rent waste to a moisture content of about at least 60%;

forming a rick of rent waste;

introducing earthworms into the rick;

maintaining the moisture content of the rick at about at least 60% until the waste is at least substantially consumed;

progressively forming an additional rick of rent waste on top of the first formed rick once each preceding rick is at least substantially consumed.

2. The method of claim 1, the organic agricultural waste being straw.

3. The method of claim 2, the step of rending being to a mean length of less than about three inches.

4. The method of claim 2, the straw being rice straw.

5. The method of claim 1, the organic agricultural waste being almond waste.

6. The method of claim 1, the step of forming a rick including forming the rick about three feet wide, of extended length and about two to three inches high of rent waste with a moisture content of about at least 60%.

7. The method of claim 1, the step of introducing earthworms being of red worms.

8. The method of claim 1, the step of maintaining the moisture content including sprinkling with water.

9. The method of claim 1 further comprising separating the casting from the worms and any unconsumed waste by screening.

10. The method of claim 1 further comprising storing the wet waste as silage before forming a rick.

* * * * *